United States Patent
Ambrosio et al.

(10) Patent No.: US 9,944,213 B2
(45) Date of Patent: Apr. 17, 2018

(54) ROBOTIC CARGO SYSTEM

(71) Applicant: Stratom, Inc., Boulder, CO (US)

(72) Inventors: Dan Ambrosio, Denver, CO (US); Jonathan Harrach-Salazar, Erie, CO (US); Mark Gordon, Lafayette, CO (US); Mark Rosenblum, Aurora, CO (US); Martin Sotola, Boulder, CO (US); Ryan Delgizzi, Boulder, CO (US); Peter James, Boulder, CO (US)

(73) Assignee: Stratom, Inc., Boulder, CO (US)

( * ) Notice: Subject to any disclaimer, the term of this patent is extended or adjusted under 35 U.S.C. 154(b) by 0 days.

(21) Appl. No.: 15/154,696

(22) Filed: May 13, 2016

(65) Prior Publication Data
US 2016/0332554 A1  Nov. 17, 2016

Related U.S. Application Data

(60) Provisional application No. 62/161,096, filed on May 13, 2015.

(51) Int. Cl.

| | | |
|---|---|---|
| *B25J 15/00* | (2006.01) | |
| *B27F 7/02* | (2006.01) | |
| *B25J 5/00* | (2006.01) | |
| *B60P 1/43* | (2006.01) | |
| *B62D 55/08* | (2006.01) | |
| *B62D 33/02* | (2006.01) | |
| *B62D 55/06* | (2006.01) | |
| *B62D 55/065* | (2006.01) | |
| *G05D 1/02* | (2006.01) | |

(52) U.S. Cl.
CPC ............... *B60P 1/43* (2013.01); *B62D 33/02* (2013.01); *B62D 55/062* (2013.01); *B62D 55/065* (2013.01); *B62D 55/08* (2013.01); *G05D 1/024* (2013.01); *G05D 2201/0216* (2013.01)

(58) Field of Classification Search
CPC ... B60P 1/43; B60P 1/44; G01M 1/125; B25J 15/00; B25J 5/00; B27F 7/02
See application file for complete search history.

(56) References Cited

U.S. PATENT DOCUMENTS

| | | | | |
|---|---|---|---|---|
| 3,628,714 A | * | 12/1971 | Offenwanger | ............ B27F 7/02 227/100 |
| 3,944,096 A | * | 3/1976 | Carder | ...................... B60P 1/02 414/345 |
| 2010/0176961 A1 | * | 7/2010 | Nelson | .................. G01M 1/125 340/689 |
| 2014/0199142 A1 | * | 7/2014 | Criswell | .................. B25J 15/00 414/395 |

FOREIGN PATENT DOCUMENTS

CN            104690709 A   *   6/2015   ................ B25J 5/00

* cited by examiner

*Primary Examiner* — Yuri Kan
(74) *Attorney, Agent, or Firm* — Holland & Hart LLP

(57) ABSTRACT

A robotic cargo system provides an ability to move cargo without requiring the use of additional material handling equipment such as forklifts and K-loaders. The robotic cargo system may operate as a vehicle during drive maneuvering, and may operate to lockdown on an aircraft as a pallet during flight. The system may navigate over rough terrain while carrying heavy loads through the use of a track-based propulsion system. The system may provide a cargo loading system, ramp ascent and descent algorithms, and autonomous navigation.

23 Claims, 21 Drawing Sheets

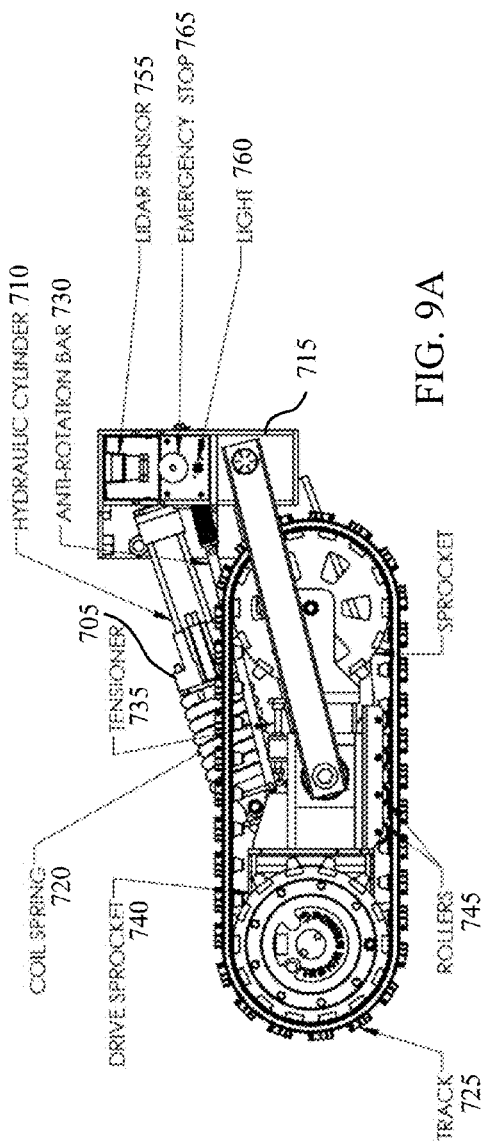
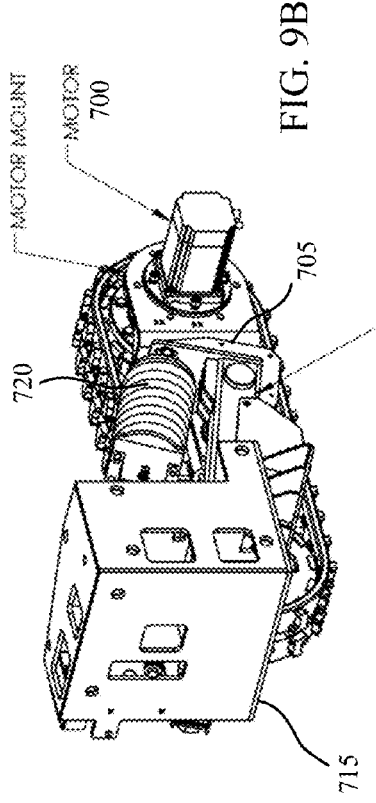
FIG. 9A
FIG. 9B

ROBOTIC CARGO SYSTEM

CROSS-REFERENCE TO RELATED APPLICATIONS

This application claims priority from U.S. Provisional Patent Application Ser. No. 62/161,096, filed on May 13, 2015, entitled "ROBOTIC CARGO SYSTEM," assigned to the assignee hereof, and expressly incorporated by reference herein.

STATEMENT REGARDING FEDERALLY SPONSORED RESEARCH OR DEVELOPMENT

This invention was made with Government support under SBIR Contract Number M67854-13-C-6502; SBIR Contract Number FA8650-12-C-5120; and Rapid Innovation Fund contract M67854-15-C-6533 contracted through the United States Marine Corp. The Government may have certain rights to this invention.

FIELD

The present disclosure is directed to material handling systems and, more specifically, to a self-propelled robotic cargo system capable of moving over unimproved terrain.

BACKGROUND

Movement of materials and equipment is a significant and important component of any supply and distribution chain. Materials and equipment are routinely required to be transported many times throughout the life cycle of the particular materials and equipment. As such, many transport systems have been developed to help efficiently move items through various different modes of transportation, including transport by road vehicles, rail vehicles, aircraft, and watercraft. One common item in many modes of transport is a pallet that is used to carry equipment and/or materials. Many types of pallets are known, which generally allow for other equipment to efficiently move the pallet. FIG. 1 shows one type of pallet 100, which is commonly used in military operations, known as a 463 L pallet. FIG. 2 shows another type of pallet 200, which is commonly used in transport of commercial and industrial goods. Of course, many other types of pallets and platforms are commonly used and are well known in the art, such as platforms used in commercial passenger and air freight aircraft. The term "pallet" is used herein to refer to any of the various types of material handling pallets or platforms.

Pallets have widespread use in commercial, industrial, and military operations, and one specific type of system is for use in military CH-53 or V-22 aircraft, which will be used as an example throughout this disclosure with the understanding that the concepts and principles apply equally to any of the various other types of pallets and platforms that may be used in material handling. Currently there are two loading configuration options when securing cargo onto a CH-53 or V-22 aircraft. Cargo is treated either as a vehicle or a pallet depending on whether or not it resides on the aircraft cargo floor or rollers. Each loading configuration has a different loading and unloading procedure. For example, equipment that is loaded onto the rollers may be tied down in the cargo bay, and loading wheeled vehicles may require deflating the tires to a pressure that is acceptable for the aircraft floor. When deployed to relatively remote areas, palletized cargo may present difficulties in transport, due to, for example, unimproved terrain. Such situations may be encountered in forward operating base (FOB) operations, and/or in relief operations where delivery of supplies may be needed for humanitarian aid, to name but two examples. In some situations, it would be advantageous to have a system that has an ability to act as a pallet or a vehicle for either cargo loading scenario.

SUMMARY

Various aspects of the present disclosure provide a robotic cargo system that provides the ability to move cargo without requiring the use of additional material handling equipment such as forklifts and K-loaders, for example. In some aspects, the robotic cargo system is designed to operate as a vehicle during drive maneuvering and lockdown on an aircraft as a pallet during flight. The system may navigate over rough terrain while carrying heavy loads through the use of a track-based propulsion system. The system, in some aspects, provides a cargo loading system, ramp ascent and descent algorithms, and autonomous navigation. In some examples, the robotic cargo system may include a system to raise and lower a system chassis and lockdown on an aircraft as a pallet during flight when the chassis is lowered. In other examples, the system may accommodate 463 L half pallet or two standard cargo pallets and may drive onto an aircraft and secure on the aircraft as a vehicle during flight.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIG. 9A shows exemplary mechanical aspects of a propulsion system for a robotic cargo system of various aspects of the disclosure;

FIG. 9B shows exemplary mechanical aspects of a propulsion system for a robotic cargo system of various aspects of the disclosure;

DETAILED DESCRIPTION

Figure 1:
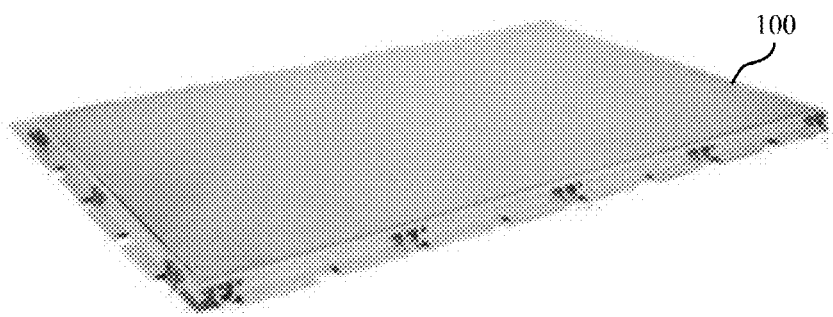
FIG. 1 is an illustration of a prior art pallet, which is commonly used in military operations, known as a 463 L pallet.
Figure 2:
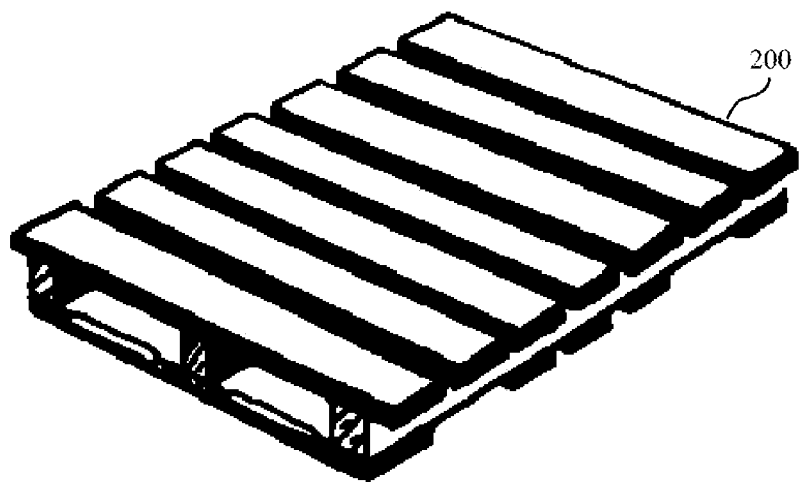
FIG. 2 is an illustration of another prior art pallet, which is commonly used in transport of commercial and industrial goods.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Various embodiments disclosed herein provide a robotic cargo system that is self-propelled and interacts with one or more control systems. The robotic cargo system of various embodiments is an electric self-propelled robotic cargo system vehicle that is designed to move palletized cargo in airbase/airport environments, and onto/off of cargo aircraft (to include airplanes and vertical lift aircraft) autonomously or teleoperatively (by remote control). In some embodiments, robotic cargo system may use hydraulic propulsion with a gasoline or diesel engine providing power to a hydraulic system. In some embodiments, the robotic pallet maintains compatibility with current military CH-53 and V-22 aircraft. Such systems provide an advanced ability to move cargo in congested, dynamic, environments of warehouses and aircraft decks without the use of additional material handling support equipment, such as K-loaders and forklifts.

As mentioned above, various embodiments are described herein with respect to specific mechanical designs compatible with current military CH-53 and V-22 aircraft. However, as will be readily apparent to those of skill in the art, numerous other embodiments may be used with other systems having different cargo handling specifications. In some embodiments, the robotic cargo system utilizes a novel tracked propulsion system to provide vehicle motion in space constrained environments that may be unimproved to provide off-road capable cargo transport in unimproved environments, in addition to still supporting the ability to load/unload cargo aircraft. The system, in some examples, may be used in a variety of situations that require moving heavy loads, such as rescue situations in which the system may be used to recover injured personnel in off-road terrain or deliver cargo to remote locations, for transportation of supplies (water, food, etc.), or for construction to move around heavy building components, to name but a few examples.

To operate autonomously and safely, the robotic cargo system of various embodiments utilizes a suite of sensors to detect its surroundings to include detection of obstacles (to include people, vehicles, boxes, walls, etc.), perform collision avoidance of obstacles, and determine its location indoors, outdoors, and within aircraft. Such sensors may include, for example, positioning sensors, Global Positioning System (GPS) sensors, inertial measurement units (IMUs), proximity detectors, cameras, stereographic imaging sensors, 3D flash LIDAR systems, LIDAR systems, and 3D Time of Flight (TOF) cameras, to name a few. As used herein, the term dense 3D sensor units may be used to refer to units that may provide data that may be used for 3D sensing around a cargo system, such as stereographic imaging sensors, 3D flash LIDAR, LIDAR, radar, and cameras coupled with image processing and recognition, for example.

Figure 3:
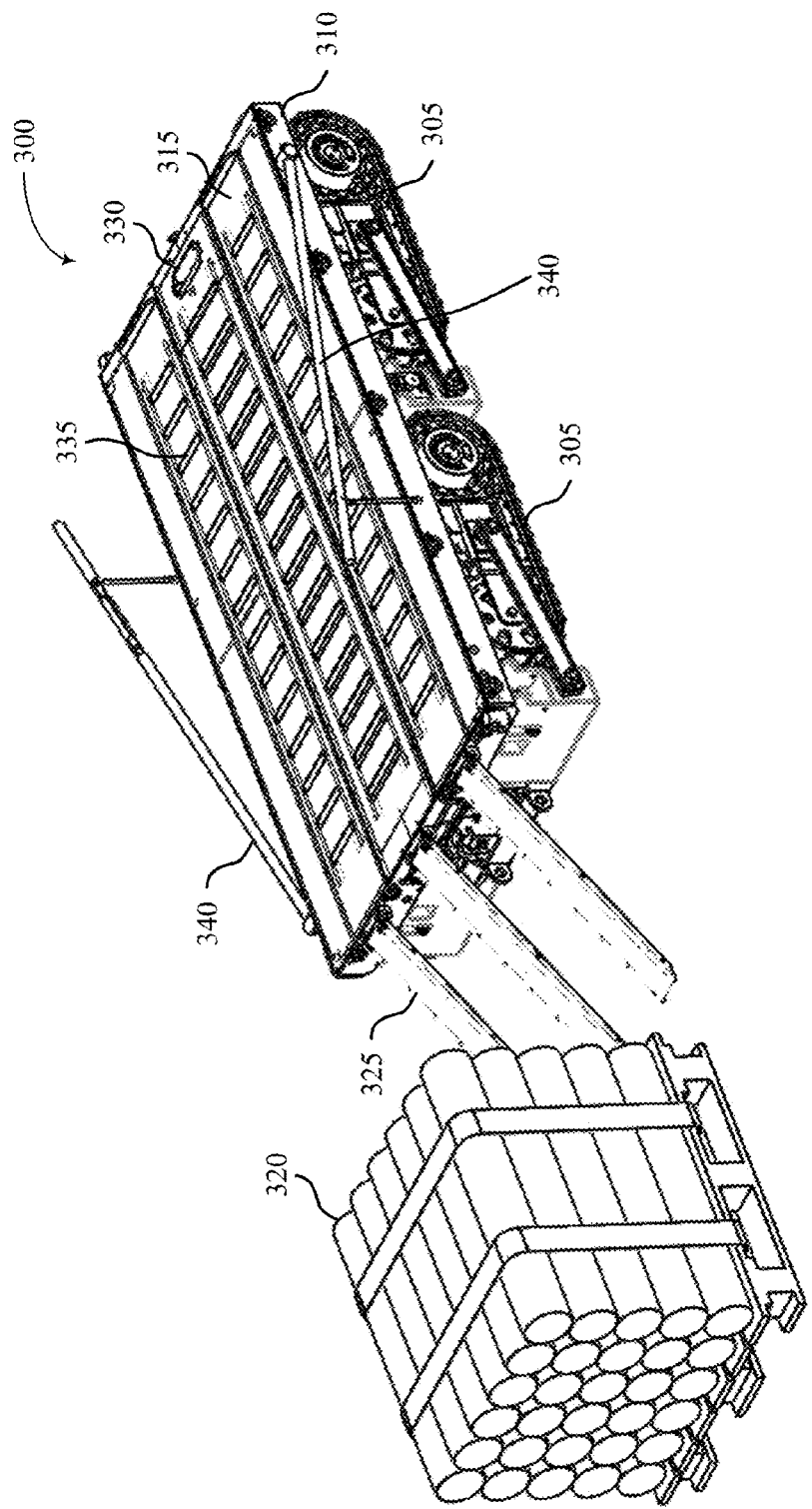
FIG. 3 shows an exemplary robotic cargo system of various aspects of the disclosure.
Figure 4:
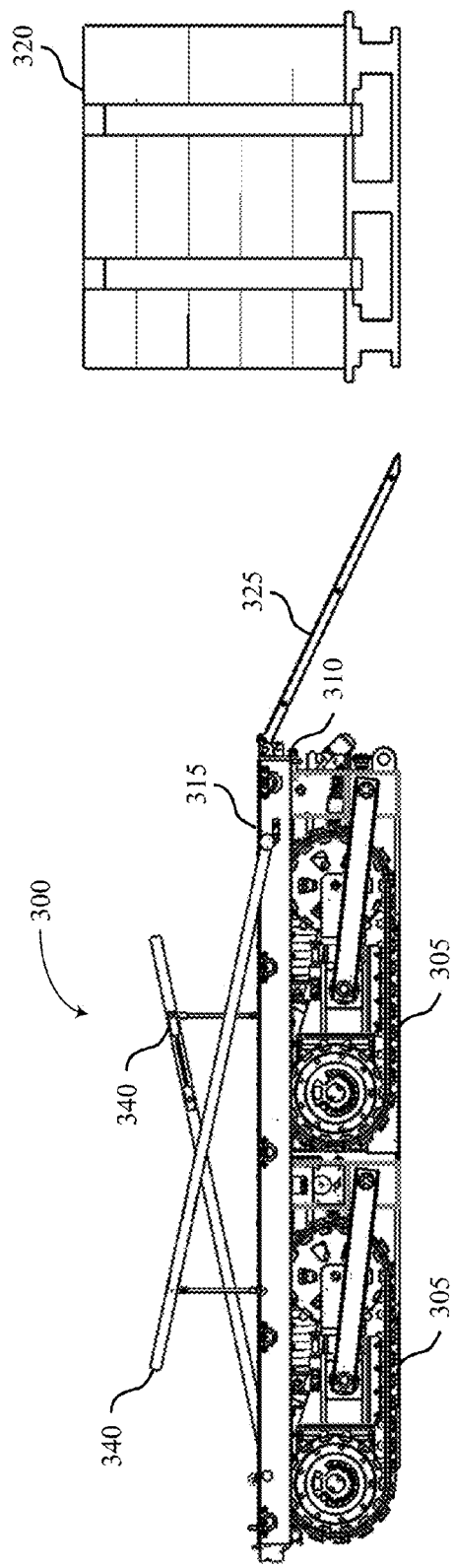
FIG. 4 shows a side view of the exemplary robotic cargo system of FIG. 3.
Figure 5:
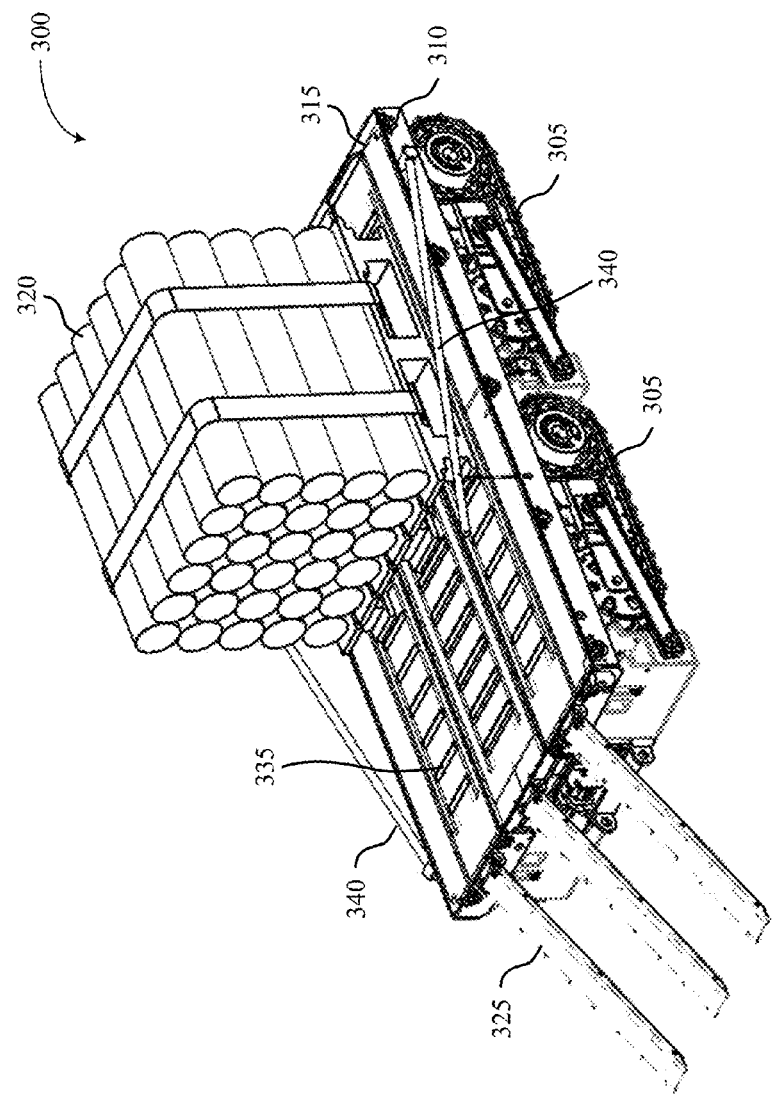
FIG. 5 shows the exemplary robotic cargo system of FIG. 3 loaded with palletized cargo, according to various aspects of the disclosure.

With reference now to FIGS. 3-5, an example of a robotic cargo system 300 is illustrated. In this example, the system includes four propulsion units 305 attached to a main chassis 310 with a top panel 315. It possible to construct the system with only two propulsion units 305 if desired. Cargo 320, which may be palletized cargo such as illustrated in FIGS. 3-5, may be loaded onto the top panel 315 through a cargo loading system that may include ramps 325 and a winch 330. The robotic cargo system 300 according to this aspect of the disclosure is a skid-steer locomotion based system designed for the purpose of material handling on unimproved as well as improved terrain. The system in these aspects is an independent tracked skid-steer vehicle, and each tracked propulsion unit 305 can be controlled independently using a Controller Area Network (CAN) framework and a central processor. Messages may be sent to and from the propulsion unit 305 motor controllers to control wheel speed/torque and status. The cargo system 300 may provide capabilities to load and unload cargo 320 without the use of a forklift or k-loader, as mentioned above. In some aspects, the system 300 is designed to fit in the cargo bay of a V-22 or CH-53 aircraft. The ability of the system 300 to retract the propulsion unit 305 tracks and rest with a flat bottom allows the system to be treated as a pallet for loading and unloading procedures on these aircraft. In some examples, the top panel 315 is configured to hold a 463 L half pallet or two standard cargo pallets.

Figure 6:
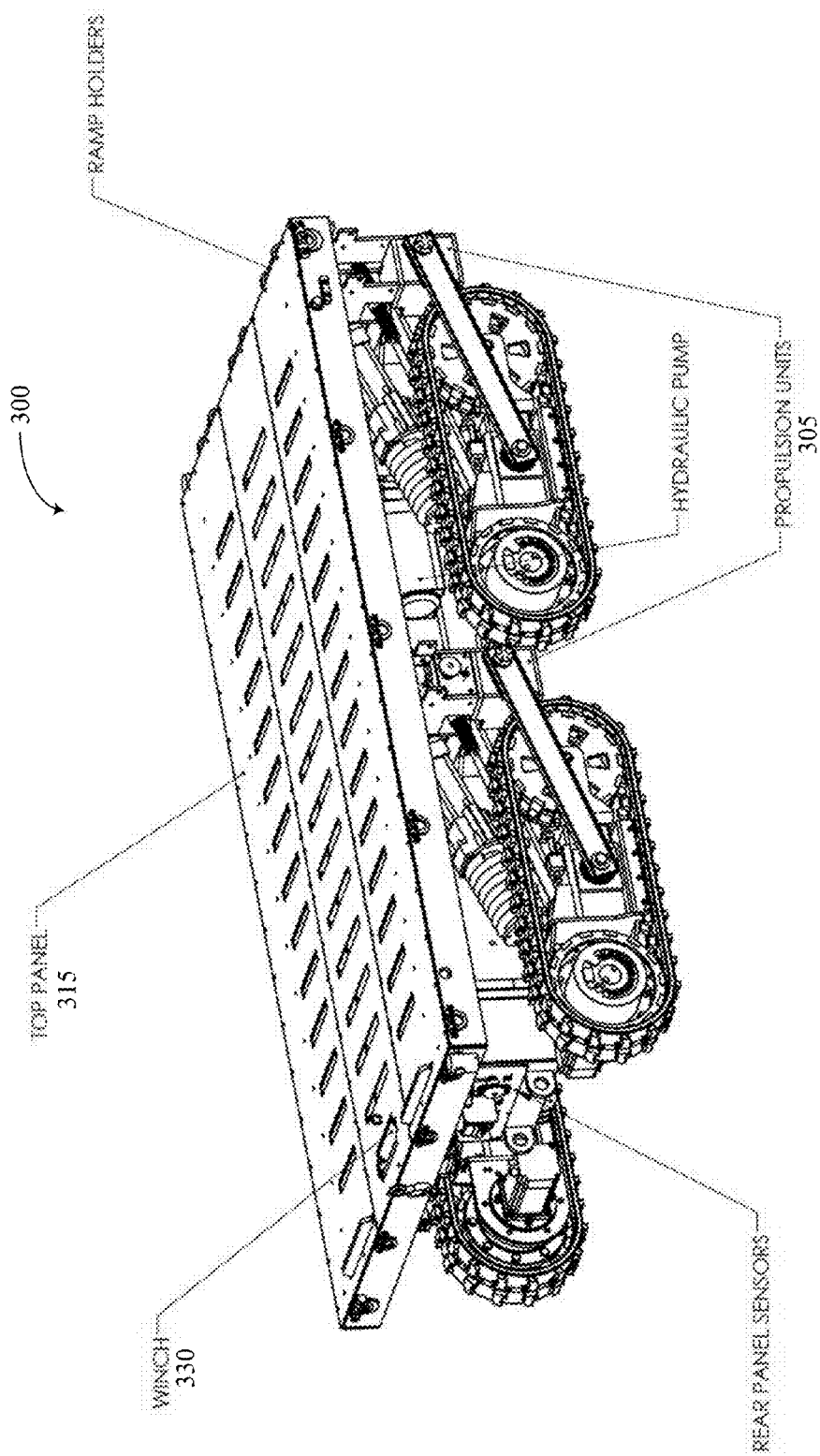
FIG. 6 shows an exemplary robotic cargo system with component identification according to various aspects of the disclosure.

When loading cargo 320, retractable ramps 325 may be extended and a winch cable attached to a cargo pallet to pull the cargo 320 up the ramps 325 and load the cargo 320. Unloading may be accomplished in a similar manner. The ramps 325 may be stored on the chassis body 310, and be removed from the chassis body 310 and placed on bars or ramp holders on the front of the system 300 for cargo loading and unloading. At that point, the winch 330 can be attached to the pallet and can be used to pull the cargo 320 onto the vehicle. A roller system 335 may be incorporated into the top plate 315 to allow loading and unloading of cargo 320 on the top plate 315 of the system 300. Handles 340 may be used to push a set of rollers 335 above the top panel 315. After cargo 320 is loaded using the winch 330 and ramps 325, the rollers 335 can be retracted and the cargo 320 can be tied down. FIG. 6 is a side perspective view of the system with labels for several of the components.

The robotic system 300, also referred to herein simply as "vehicle," can be controlled by an operator through the use of a handheld controller. Such a controller may wirelessly communicate with the vehicle's main computer and report vehicle health and status to the operator, according to some examples. The controller also may provide the user with the ability to manipulate one or more system functions including, but not limited to, driving, altering vehicle height, enabling the winch, beginning ramp ascent, activating waypoint following, or braking the vehicle.

Figure 7:
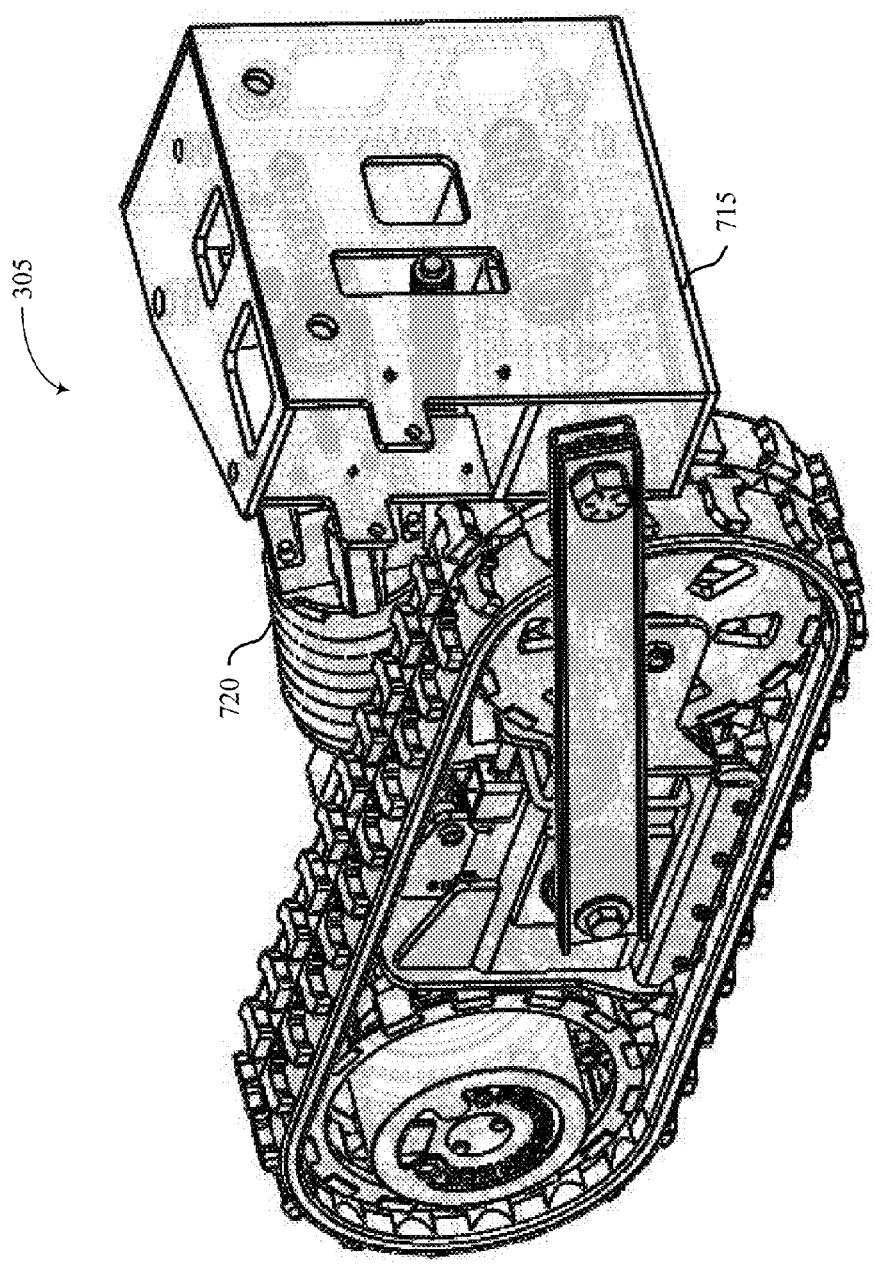
FIGS. 7-8 show exemplary mechanical aspects of a propulsion system for a robotic cargo system of various aspects of the disclosure.
Figure 8:
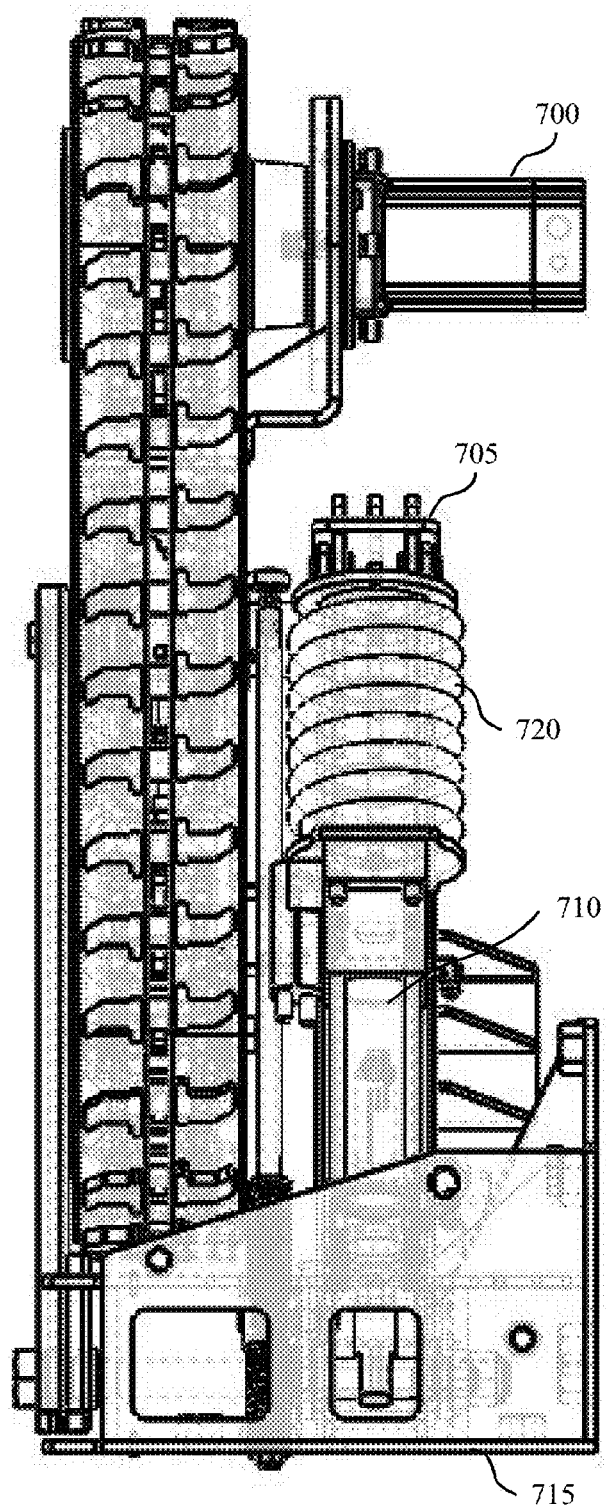

As mentioned above, the system of various aspects includes four propulsion units 305, as illustrated in FIGS. 7-9. In the examples of FIGS. 7-9 each propulsion unit 305 may include a motor 700, suspension 705, a hydraulic system used to propel, raise, and lower the chassis, and a controller 715 to control operation of the unit. In some examples, each propulsion unit 305 may include a coil spring 720 for shock absorption and a hydraulic cylinder 710 to provide height manipulation. In some examples, the system uses CANopen motor controllers to communicate between each propulsion unit controller 715 and a master computing system. The motors 700 in some examples may be driven electrically using a battery system (e.g., a 48 V battery system). The controller 715 at each propulsion unit 305 may respond to speed and torque commands from the master computing system and use them to power the drive motors 700. The propulsion units 305 may be mounted to the side of the chassis 310 using bolts. The propulsion units 305 main components, indicated in FIGS. 9A and 9B, may include a drive motor 700, track 725, coil spring 720, hydraulic cylinder 710, anti-rotational bar 730, tensioning system 735, drive sprockets 740, and support rollers 745. In the example of FIGS. 9A and 9B, two braces surround welded components that hold the motor 700, drive sprockets 740, and tensioner 735. A jam nut is just one example of a method to tension the track 725. Rollers 745 are provided in the middle of the track 725 to provide support when the vehicle runs over obstacles. The main lever 750 of these examples is a four bar linkage that contains the coil spring 720 with a hydraulic cylinder 710. The spring 720 provides dampening for off-road terrain, and the hydraulic cylinder 710 allows the drive unit 305 to retract into the frame 310. The anti-rotational bar 730 acts to keep the tread from freely spinning when the tread does not contact the ground, and the springs on this bar act as a pre-load to keep the tread horizontal. In some examples, one or more of the propulsion units 305 may include a LIDAR sensor 755, a light 760, and an emergency stop button 765.

In some examples, air based springs could be used as a replacement for the coil springs 720. Additionally, a fully hydraulic system could replace the need for electric motors 700. Furthermore, in some examples, a dampening shock may be provided to help reduce the sudden impacts that may occur on the tracks 725.

As mentioned above, the robotic cargo system of various aspects may provide autonomous or partially autonomous movement of cargo. In some aspects, the system may utilize multiple computing systems to control the operation of the system, that may be coupled with multiple onboard sensors and devices. In some examples, a low-level control and status interface may communicate with the onboard sensors and devices, as well as the propulsion units. A second system may be used for high level algorithms such as waypoint following, and autonomous ramp ascent. The two systems may communicate over TCP/IP using a defined data protocol. As mentioned above, the system in some aspects may utilize CANopen motor controllers to communicate between each motor controller and the low-level master computing system.

Figure 10:
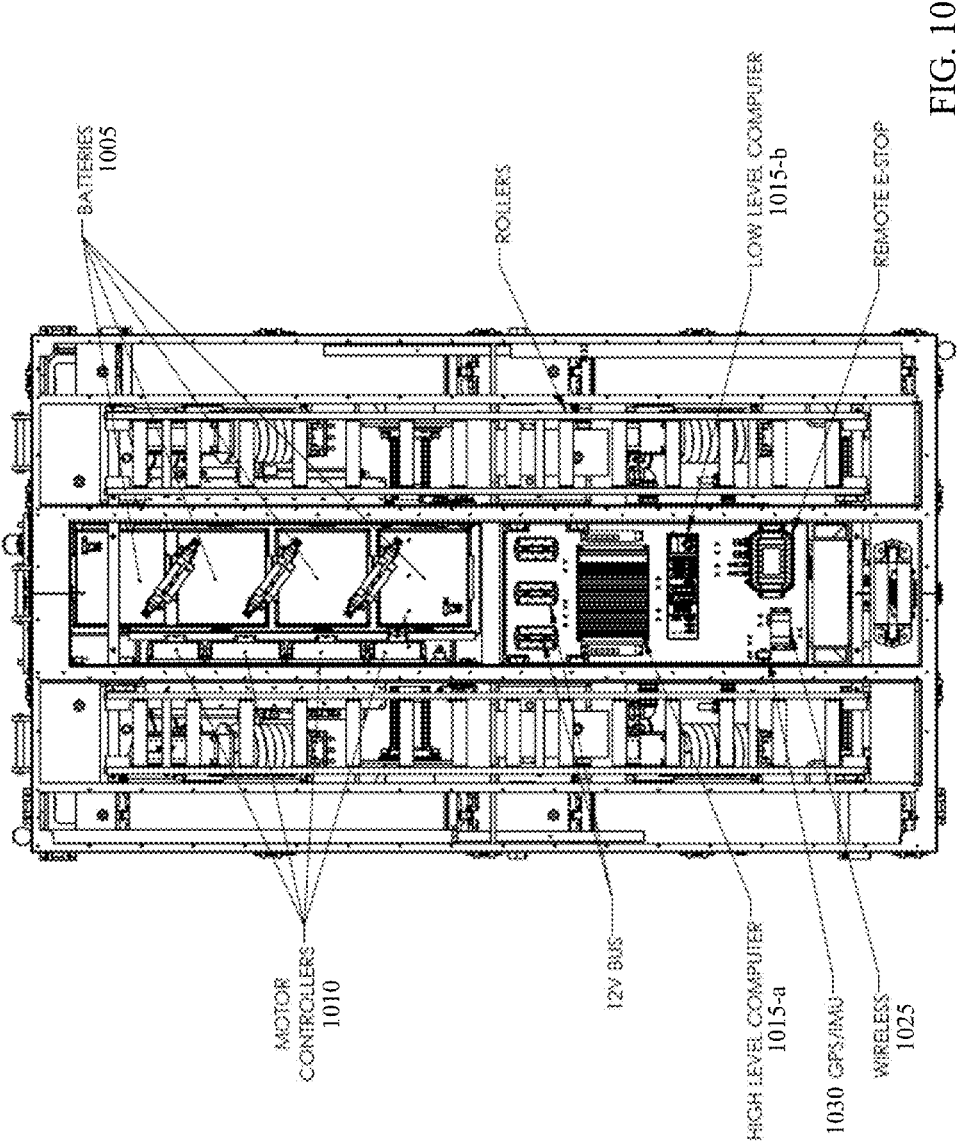
FIGS. 10-13 show exemplary mechanical aspects of a robotic cargo system of various aspects of the disclosure.
Figure 11:
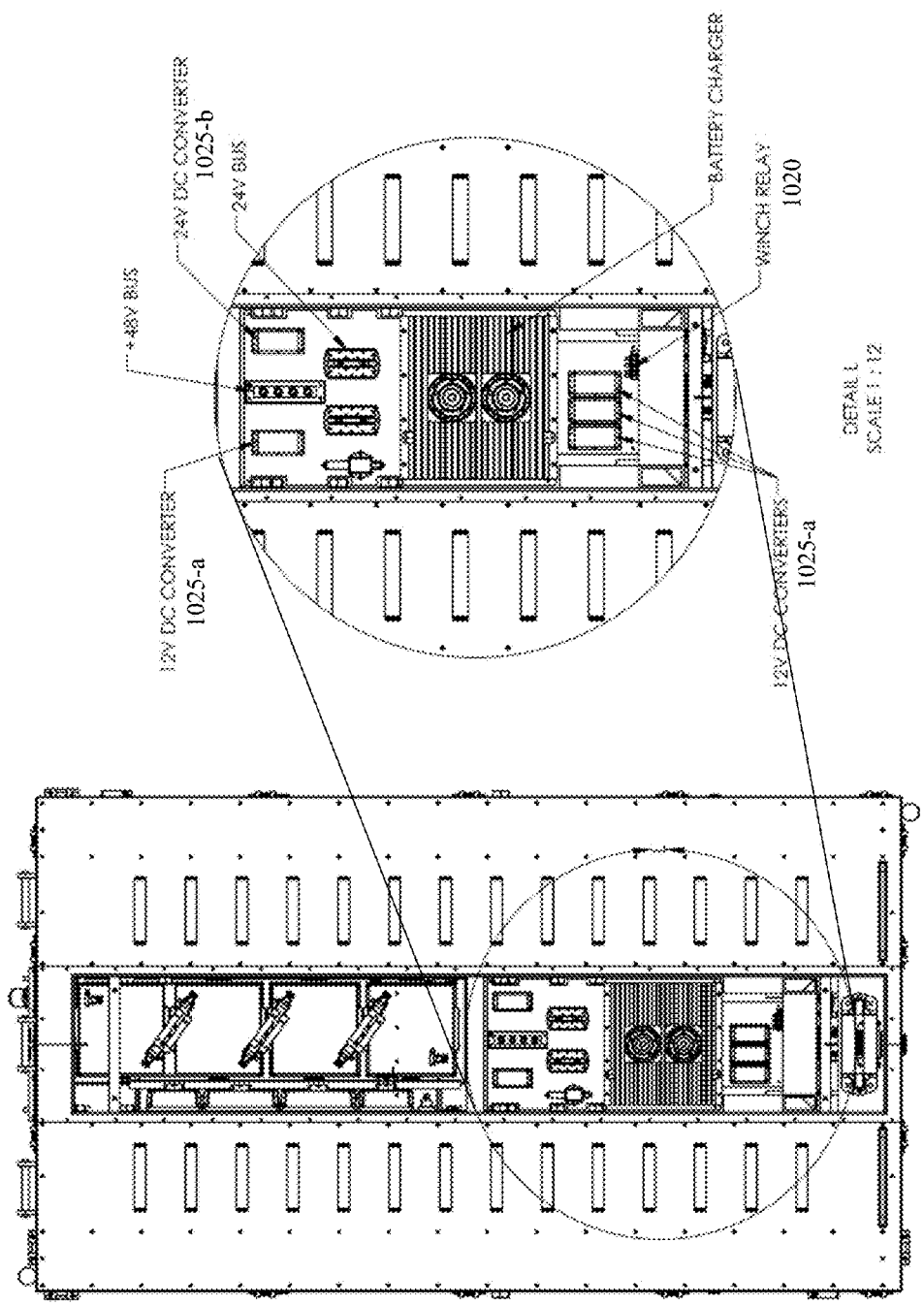

With reference now to FIGS. 10 and 11, exemplary locations of the internal components of the system are illustrated. The internal components in these examples include an electronic system distributed over two panels. Major elements to this system include batteries 1005, motor controllers 1010, computers 1015, motor relays, and dc-dc converters 1025. In the example of FIGS. 10 and 11, a first electronics panel that may house batteries 1005, motor controllers 1010, computers 1015, motor relays, and communication devices 1025 for safety. In the example of FIGS. 10 and 11, a second electronics panel exists below the first and houses other electronics such as dc-dc converters 1025 and winch relay 1020. Of course, one of skill in the art will readily recognize that other or different electronic configurations and layouts may be readily implemented and are within the scope of the present disclosure.

The control systems of the cargo system may rely on data from multiple sensors. In some examples, the system may include a number of sensors to provide data to the central processor from the mechanical components. In some examples, feedback for vehicle speed, height, and orientation is provided by a suite of sensors including rotary encoders, linear sensors, tilt sensors, and ground speed sensors. Waypoint following and obstacle avoidance algorithms use data from LIDAR sensors and a GPS/IMU sensor 1030.

Figure 12:
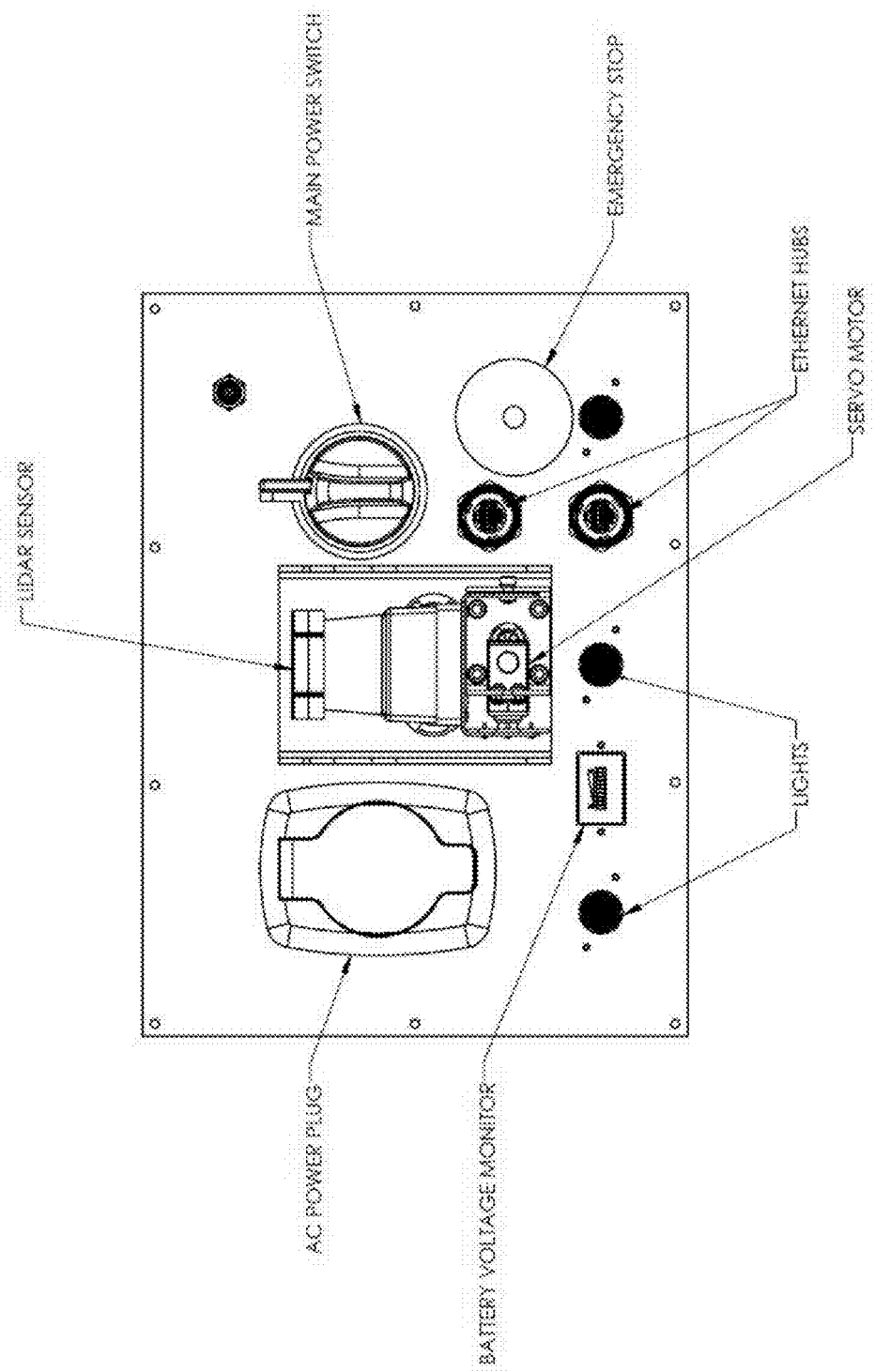
Figure 13:
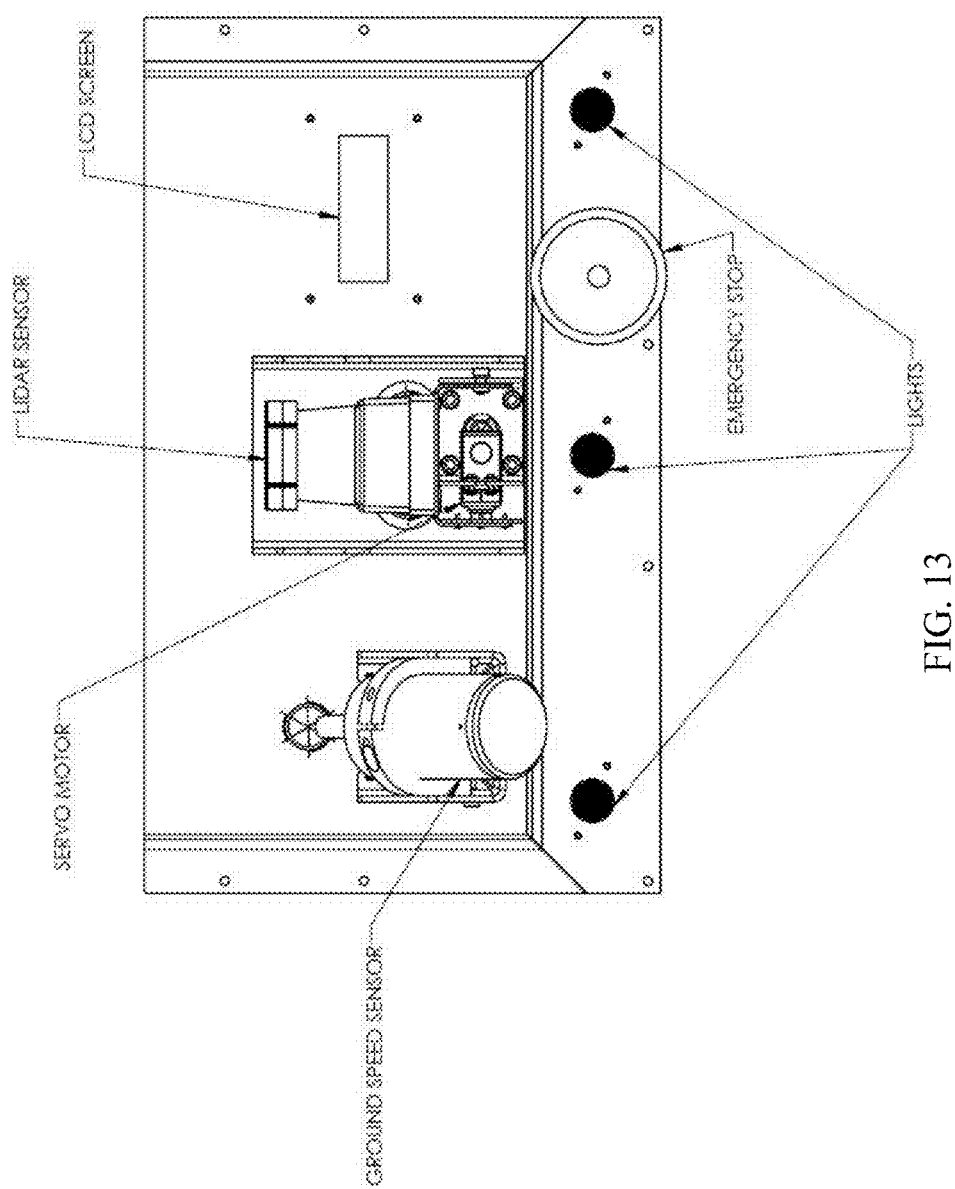

FIGS. 12 and 13 illustrate rear and front panels of the system, respectively, according to some examples. The panels provide a location for interaction with the user; including emergency stop buttons, charging ports, power switches, LCD screens, and various sensors.

As discussed above, the system may include multiple sensors to provide control and operation of the system. In some aspects, data that may be used to operate the vehicle may include one or more of:

Vehicle height—which may be calculated with hydraulic cylinder linear sensors, and that also could be achieved using downward pointing LIDAR systems;

Motor speed—which may be calculated using encoders on the motor and freewheel;

Track angle—which may be calculated with data from one or more tilt sensors on the track of each propulsion unit, or through the use of encoders on a track bearing;

Vehicle orientation—which may be calculated based on data from tilt sensors, a GPS, and/or an IMU;

Vehicle speed—which may be calculated based on data from a ground speed sensor and/or encoders associated with each propulsion unit. In some examples, GPS data may also provide vehicle speed, and LIDAR also may provide speed data as well;

Vehicle location—which may be calculated based on GPS data and/or any of the other data as discussed above;

Ramp detection of an aircraft or vehicle ramp—which may be calculated based on LIDAR data to detect ramp edges, and/or other imaging components such as cameras or time of flight cameras;

Collision detection—which may be determined based on LIDAR detection data, sonar, or cameras (time of flight cameras may also provide distance data to prevent collisions).

Figure 14:
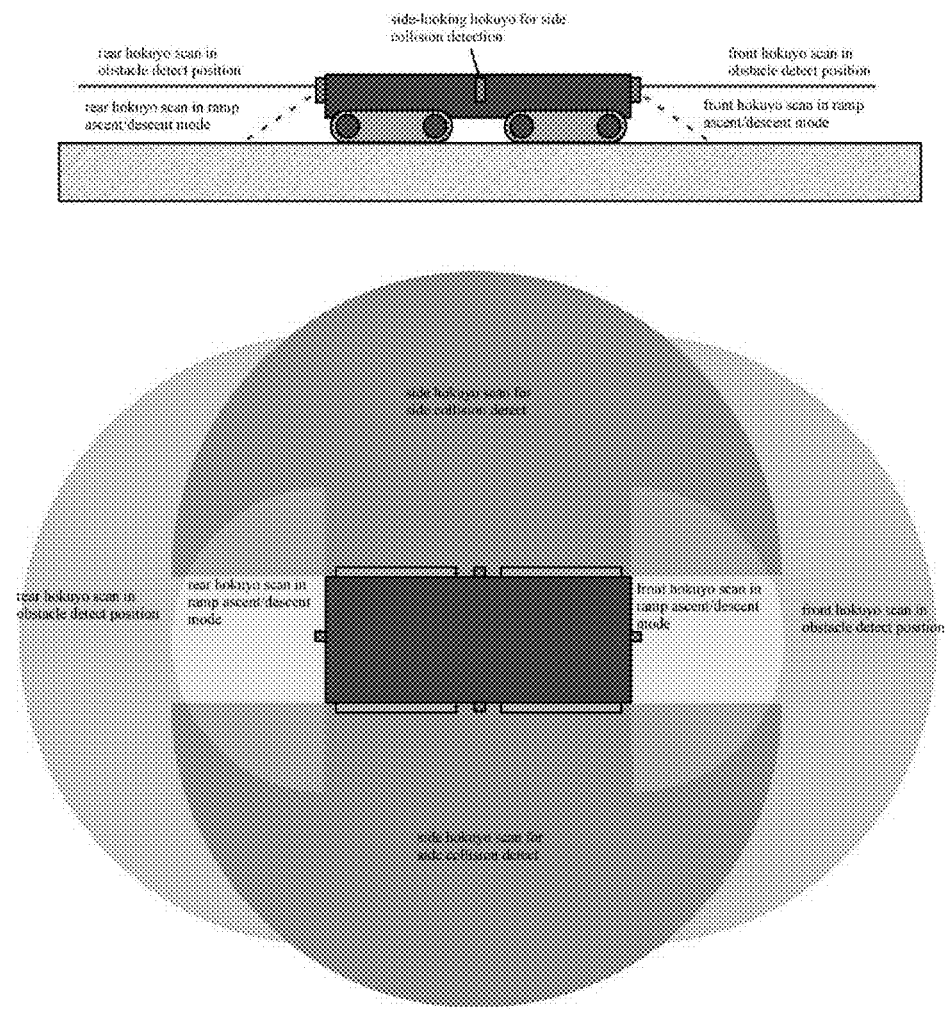
FIG. 14 shows operation of exemplary sensors for autonomous movement of the robotic cargo system according to various aspects of the disclosure.
Figure 15:
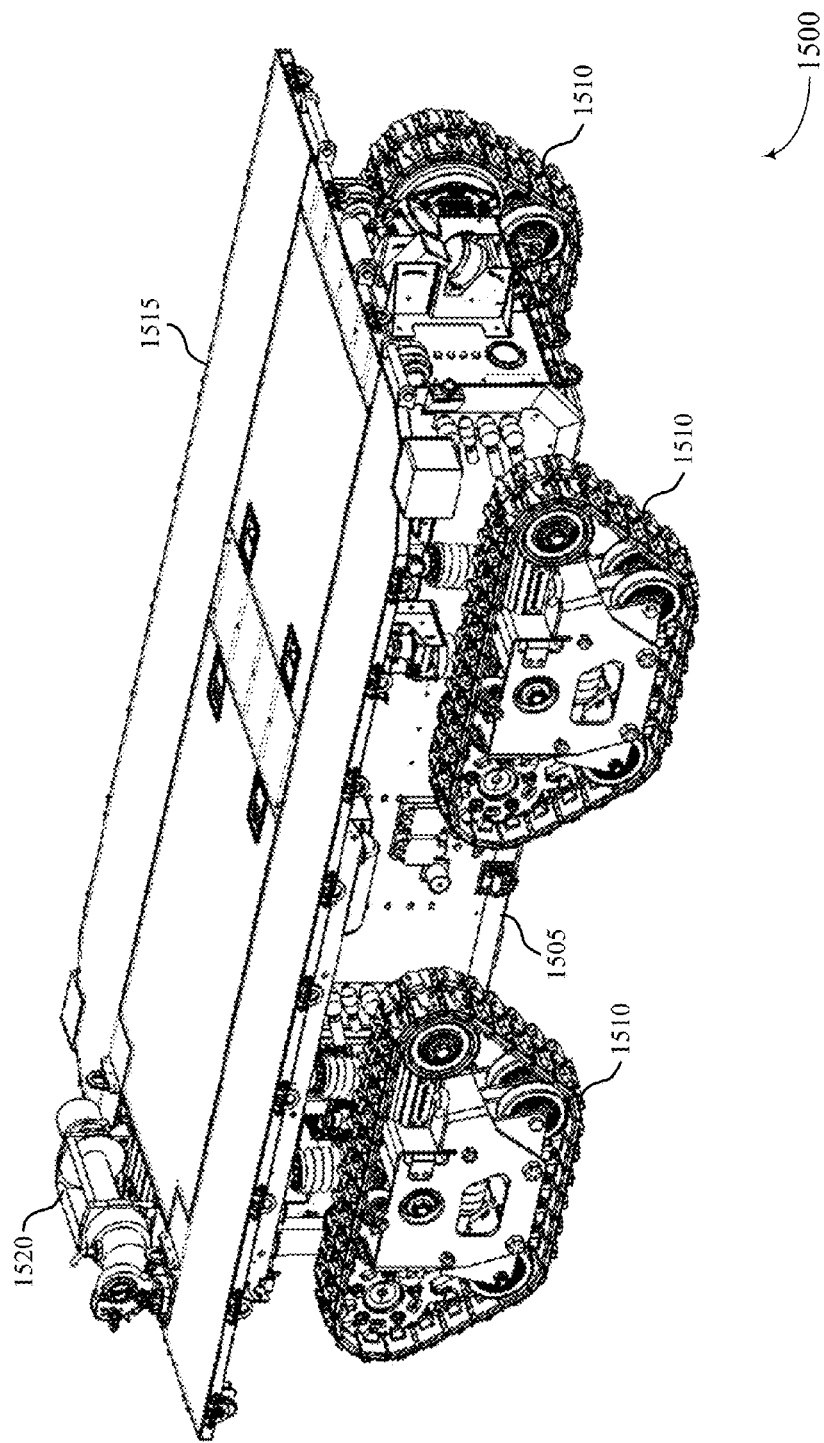
FIG. 15 shows another exemplary robotic cargo system of various aspects of the disclosure.
Figure 16:
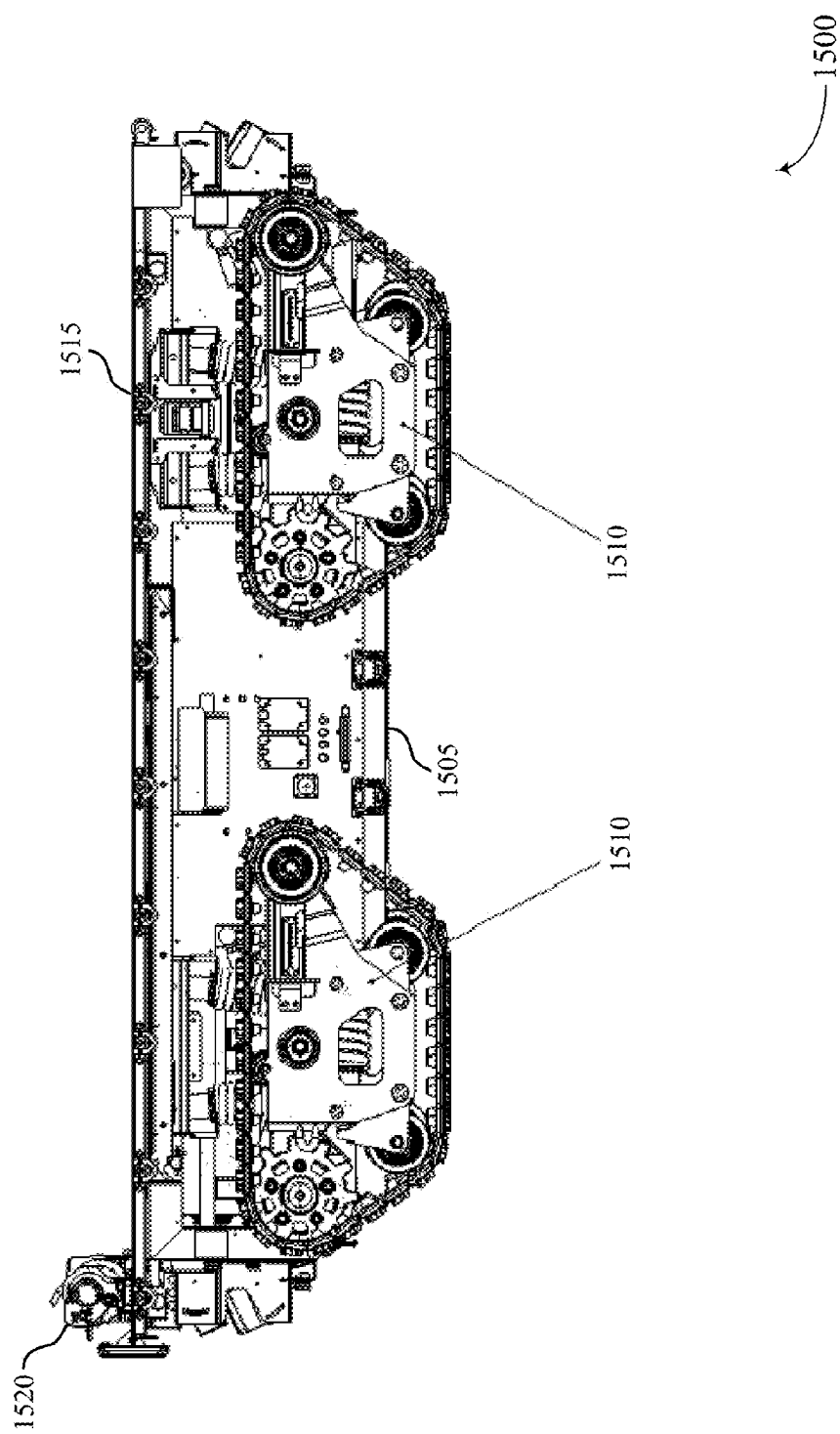
FIG. 16 shows a side view of the exemplary robotic cargo system of FIG. 15.
Figure 17:
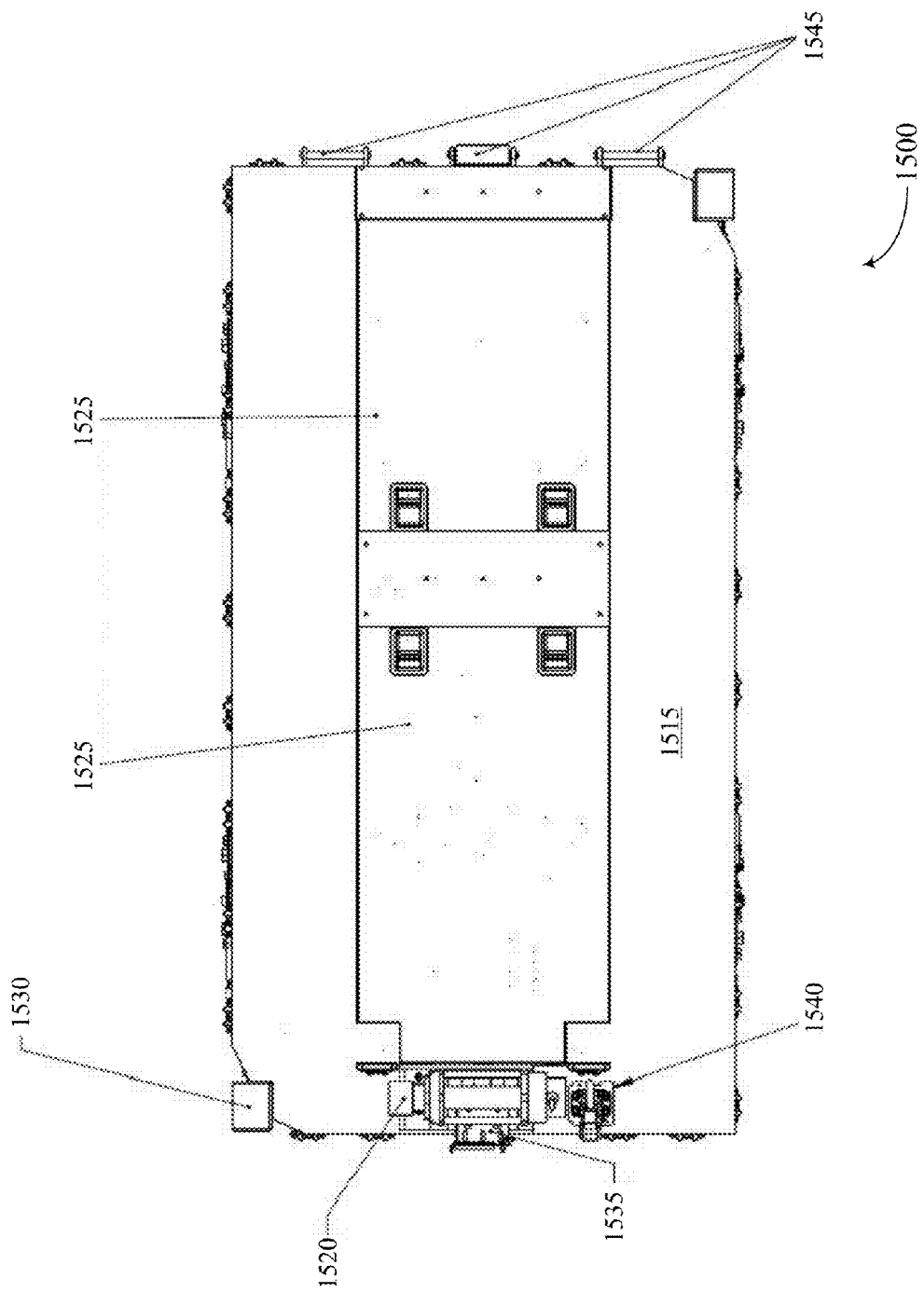
FIG. 17 shows a top view of the exemplary robotic cargo system of FIG. 15.

As discussed, various aspects of the disclosure provide for autonomous movement of the robotic cargo system. FIG. 14 shows operation of exemplary sensors for autonomous movement of the robotic cargo system according to various aspects of the disclosure. In this example, the system may include laser rangefinders (e.g., LIDAR sensors) on each side of the vehicle. The front and rear sensors may scan for obstacles for collision avoidance purposes, as well as scan for ramp detection for loading and unloading of the system to/from an aircraft or other vehicle. Sensors on each side of the vehicle may provide scanning for collision avoidance. The sensor coverage for each of the front, rear, and side sensors is illustrated in the top view of FIG. 14.

With reference now to FIGS. 15-22, another example of a robotic cargo system 1500 is illustrated. In this example, the system includes a main chassis 1505 with four propulsion units 1510 attached thereto, with a top panel 1515. It is possible to construct the system with only two or three propulsion units 1510, if desired. Cargo 1597 (FIG. 20), which may be palletized cargo, may be loaded onto the top panel 1515 through a cargo loading system that may include ramps 1595 and a winch 1520. The robotic cargo system 1500 according to this aspect of the disclosure. similarly to the example of FIGS. 3-13, may provide a skid-steer locomotion based system designed for the purpose of material handling on unimproved as well as improved terrain. Each half of the vehicle of FIGS. 15-22 may be controlled independently by sending analog voltage signals to hydraulic pumps. These signals dictate the speed and direction of the propulsion units. The cargo system 1500 may provide capabilities to load and unload cargo 1597 without the use of a forklift or k-loader, as mentioned above. In some aspects, the system 1500 is designed to fit in the cargo bay of a V-22 or CH-53 aircraft, and the top panel 1515 may accommodate a 463 L half pallet or two standard cargo pallets. The system 1500 of this example does not have the ability to retract the propulsion units 1510 to rest with a flat bottom, and thus may be treated as a vehicle for loading, unloading, and flight procedures on these aircraft.

The top panel 1515 may, in some examples, include removable access panels 1525 that may be used to access electronics and controls of the system 1500. An antenna 1530 may be coupled with a transmitter/receiver within the system 1500 to provide wireless communications with one or more external control, positioning, or monitoring systems. The top panel 1515 may also have a tow attachment 1535, a removable tow hook 1540, and a number of ramp attachments 1545. The ramp attachments 1545 may provide an attachment point for ramps 1595, which may be stored on the chassis 1505 in some examples.

Figure 18:
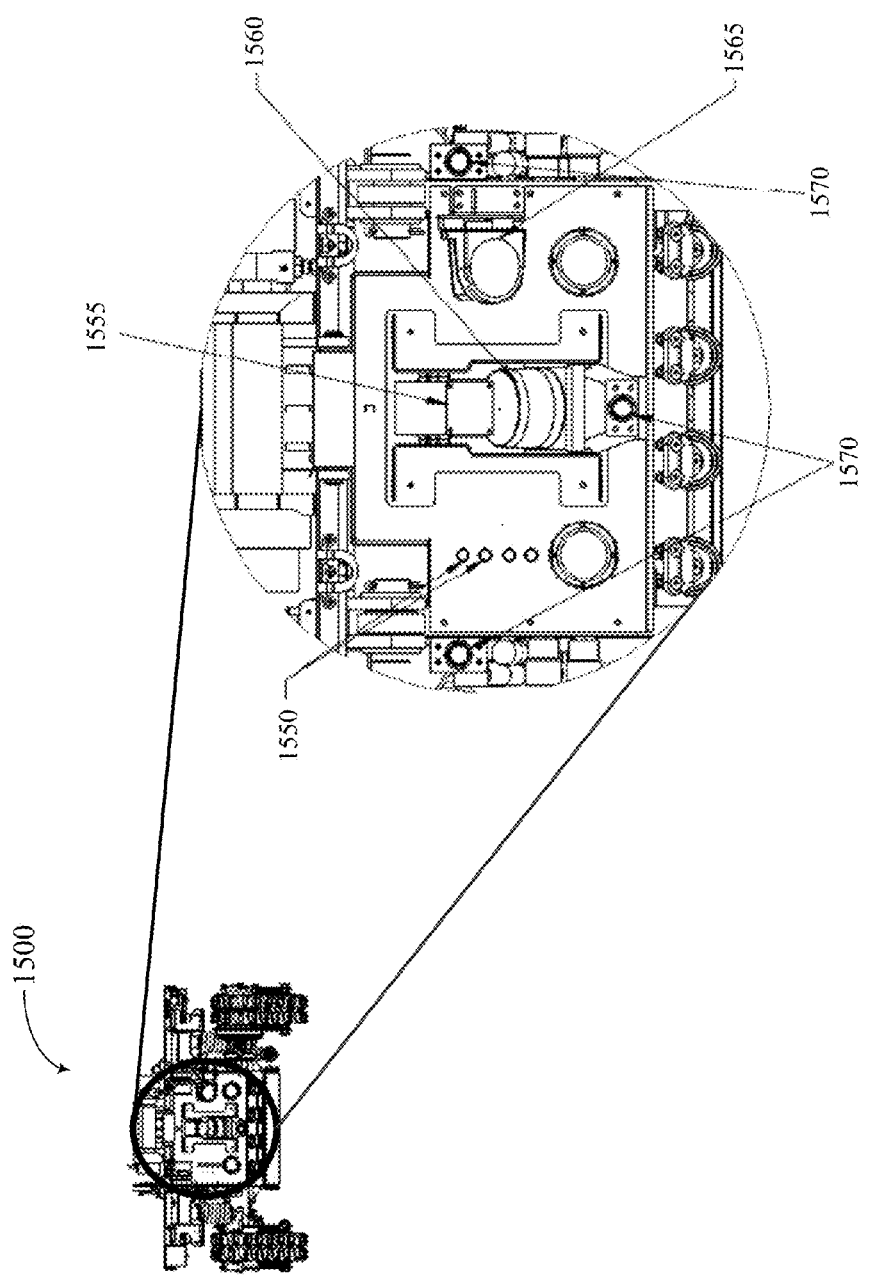
FIG. 18 shows a front view of the exemplary robotic cargo system of FIG. 15 with a detail view of some front electronic components of the system.
Figure 19:
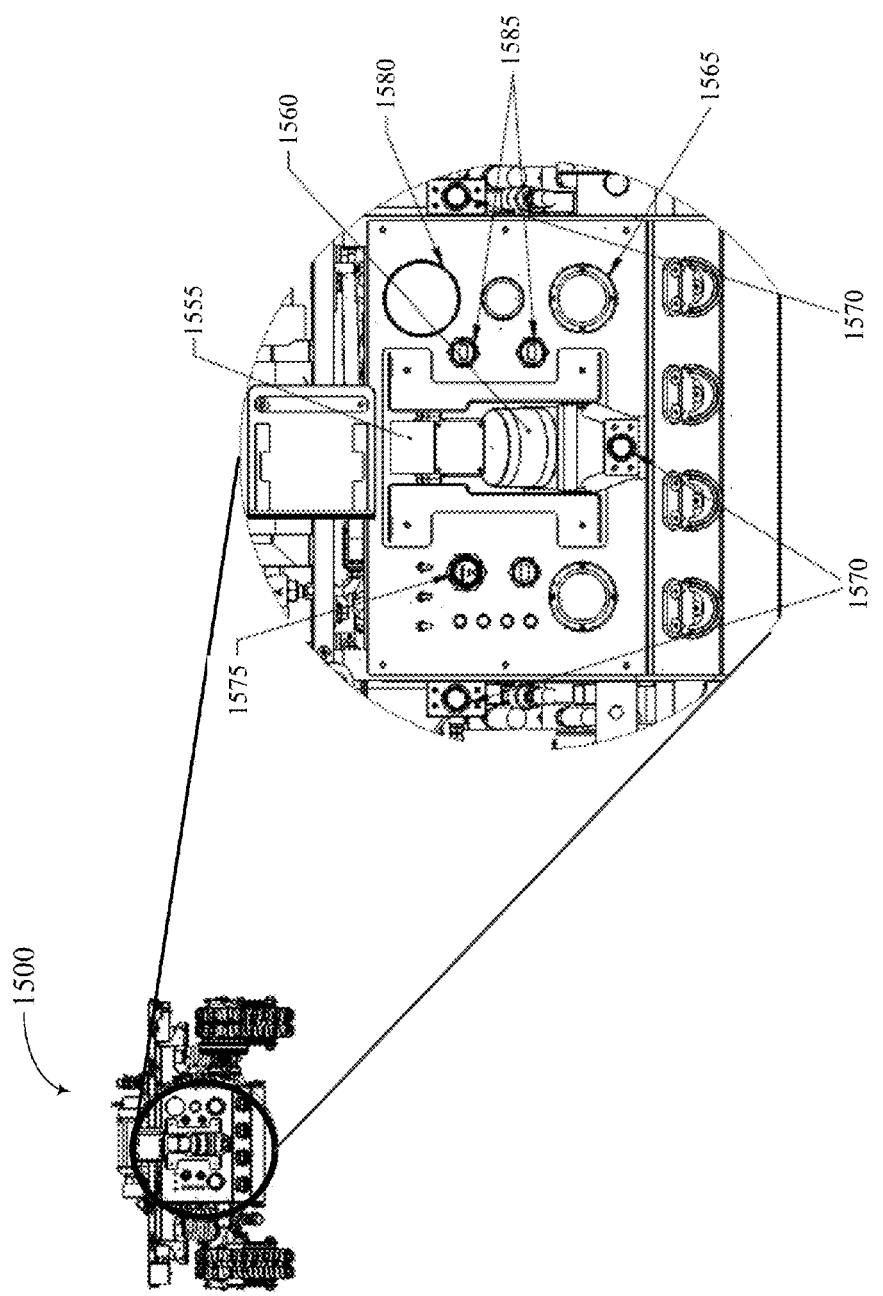
FIG. 19 shows a rear view of the exemplary robotic cargo system of FIG. 15 with a detail view of some rear electronic components of the system.

FIGS. 18 and 19 show front and rear views of the cargo system 1500, with detail views of some of the electronics that may be included with the cargo system 1500. In the front detail view of FIG. 18, the front of the system 1500 may include status lights 1550, a camera 1555, a LIDAR sensor 1560, a ground speed sensor 1565, and acoustic sensors 1570. In the rear detail view of FIG. 19, the rear of the system 1500 may include an Ethernet connector 1575, a camera 1555, a LIDAR sensor 1560, an engine interface 1580, debug ports 1585 (e.g., serial ports), status lights 1565, and acoustic sensors 1570.

Figure 20:
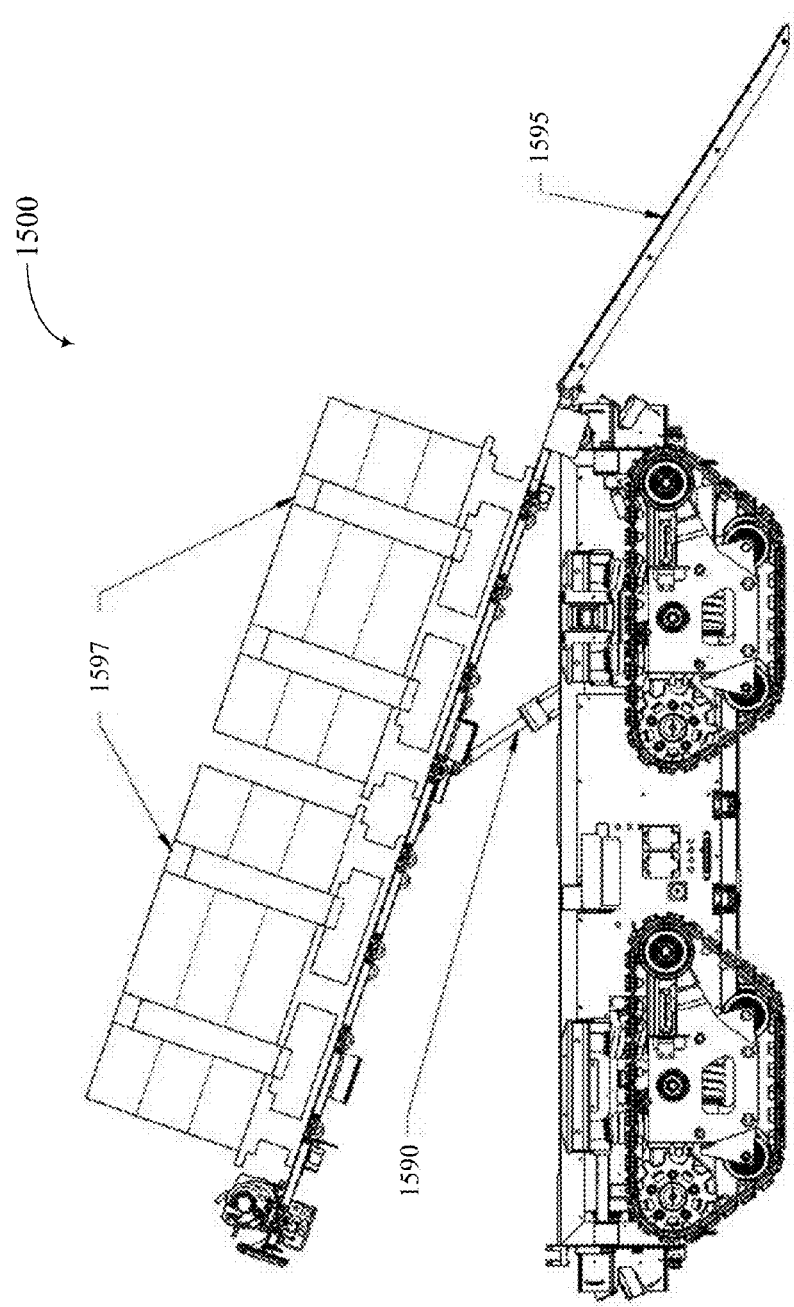
FIG. 20 shows the exemplary robotic cargo system of FIG. 15 loaded with palletized cargo and a hydraulic top surface to facilitate unloading, according to various aspects of the disclosure.

In some examples, the cargo system 1500 may include a hydraulic cylinder 1590 mounted under the top panel 1515, best seen in the illustration of FIG. 20, which may facilitate unloading of cargo 1597 by raising one end of the top panel 1515 such that an inclined plane is formed and the cargo 1597 may be more easily moved down the top panel 1515 and down ramps 1595. In some examples, the top panel 1515 may have a relatively low friction top surface that may facilitate moving cargo 1597 onto and off from the top panel 1515. In other examples, as discussed above, the top panel 1515 may include rollers or other devices to facilitate loading and unloading of cargo.

Figure 21:
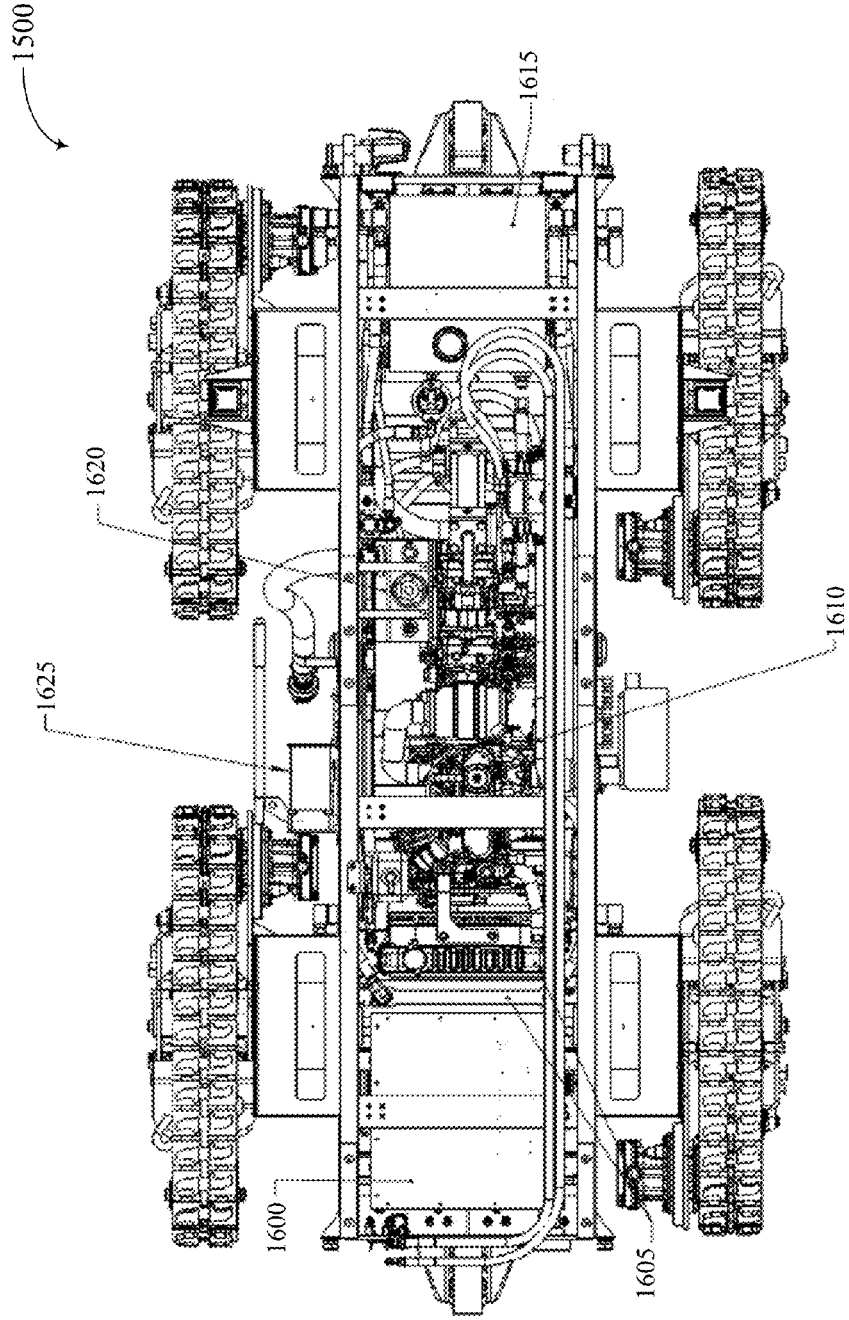
FIG. 21 shows exemplary mechanical aspects of a bottom view of the robotic cargo system of FIG. 15.

The cargo system 1500 of some examples may include an engine that provides power and locomotion for the system, such as a gasoline or diesel engine, for example. In other examples, one or more electric motors may be used for locomotion. In the example system 1500, a diesel engine 1610 is mounted on the chassis 1605, as best seen in the illustration of FIG. 21. A pump may be directly mounted to the engine and is able to hydraulically drive each propulsion unit 1510, in some examples. In certain examples, the engine may power a generator that may be used to provide power to electric motors at each propulsion unit as well as to provide power to other electronic components of the system 1500. Also included on the chassis, as may be seen in FIG. 21, may be engine/hydraulic radiators 1605, a hydraulic tank 1615, a fuel tank 1620, a brake release pump 1625, and an electronics system housing 1600.

Figure 22:
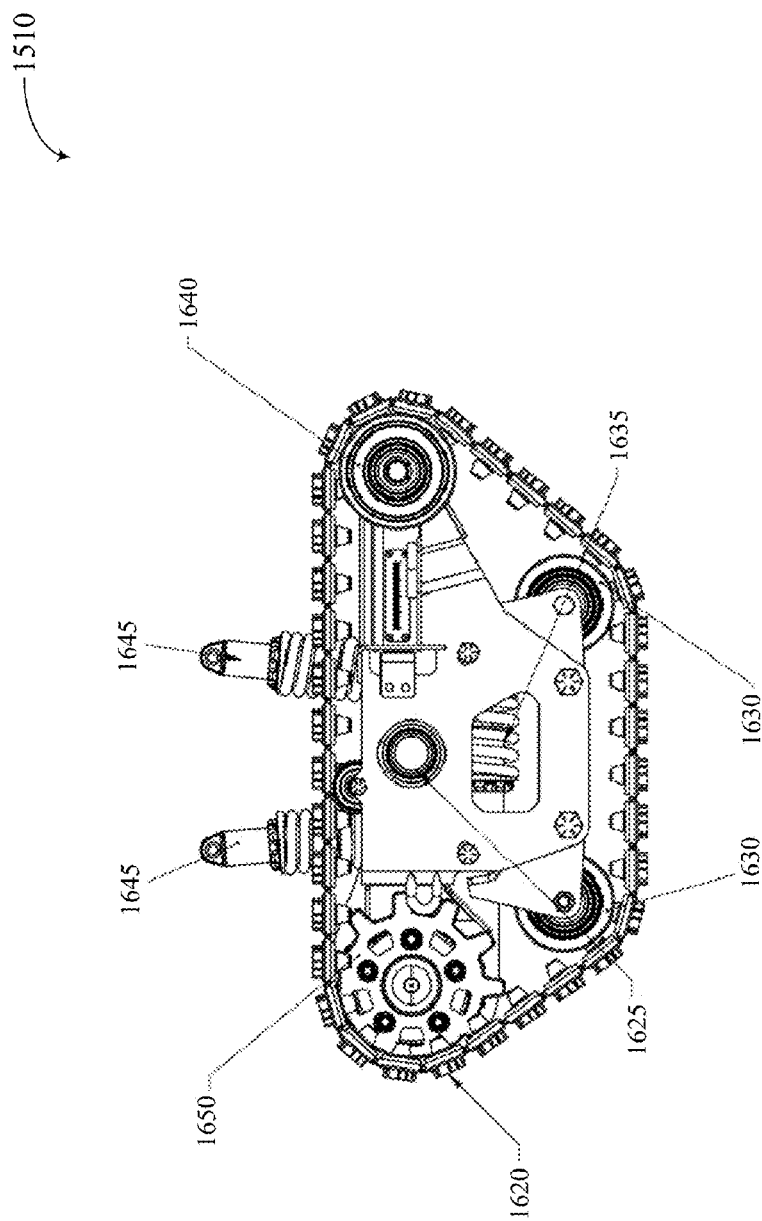
FIG. 22 show exemplary mechanical aspects of a propulsion unit of the robotic cargo system of FIG. 15.

FIG. 22 is a more detailed view of a propulsion unit 1510 of some examples. In the example of FIG. 22, the propulsion unit 1510 may be a tracked unit having a rubber track 1620, an axle 1625, boogie wheels 1630, a boogie suspension 1635, a tensioning pulley 1640, anti-rotation shocks 1645, and a drive sprocket 1650. While a tracked propulsion unit 1510 is illustrated in these examples, it will be readily understood that other types of propulsion units may be used, such as wheeled propulsion units.

Similarly as discussed above, the system 1500 may include multiple sensors to provide control and operation of the system. In some aspects, data that may be used to operate the vehicle may include one or more of: vehicle orientation (e.g., based on a GPS, and/or an IMU); vehicle speed (e.g., based on data from a ground speed sensor and/or encoders associated with one or more propulsion unit, GPS data, LIDAR data, or combinations thereof); vehicle location (e.g., based on GPS data and/or any of the other data as discussed above); aircraft or vehicle ramp detection (e.g., based on image recognition from a camera or TOF camera, LIDAR data, and/or other imaging components); and collision detection data (e.g., based on LIDAR data, sonar, radar, or imaging data from one or more cameras or TOF cameras). In some examples, a system controller may execute autonomous driving operations to move the vehicle up or down an aircraft ramp, and to move the vehicle within the aircraft to an identified cargo location within the aircraft (e.g., based on known cargo locations within an aircraft and information from one or more sensors that indicates a cargo location is available). Furthermore, although a cargo vehicle is described in the various examples herein, it will be understood that the suite of sensors, ramp ascent and descent algorithms, and driving algorithms may be implemented on other types of vehicles as well.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A robotic cargo apparatus, comprising:
   a vehicle chassis;
   a top panel coupled with the chassis, the top panel configured to receive cargo to be transported using the robotic cargo apparatus;
   a plurality of propulsion units coupled with the chassis, each of the propulsion units coupled with a power source, suspension, a drive system, and a controller to control operation of the propulsion unit; and
   a controller coupled with each of the plurality of propulsion units to control each of the propulsion units to operate as a vehicle during drive maneuvering and to move the apparatus onto an aircraft, and that executes autonomous ramp ascent and descent algorithms to move the robotic vehicle onto and off of the aircraft; and
   a plurality of sensors coupled with the chassis and coupled with the controller that provide information to the controller related to a position of the robotic vehicle relative to an aircraft loading ramp.

2. The robotic cargo apparatus of claim 1, further comprising:
   a cargo loading system including a ramp and a winch to move cargo onto the top panel.

3. The robotic cargo apparatus of claim 2, wherein the cargo loading system moves cargo on to the top panel without assistance from a forklift or k-loader.

4. The robotic cargo apparatus of claim 1, wherein the top panel has a length and width corresponding to accommodate a 463 L half pallet or two standard cargo pallets.

5. The robotic cargo apparatus of claim 1, wherein the top panel comprises one or more of:
   a low friction surface
   a plurality of rollers extendable through the top panel, coupled with the chassis and a handle that is movable to extend the rollers at least partially through the top panel and to retract the plurality of rollers below the top panel.

6. The robotic cargo apparatus of claim 1, further comprising a plurality of sensors coupled with the controller that provide information to the controller related to a position of the robotic cargo apparatus.

7. The robotic cargo apparatus of claim 6, wherein the controller comprises a low-level control and status interface coupled with one or more of the plurality of sensors and a high-level control interface that executes autonomous and assisted driving operations or autonomous ramp ascent and descent algorithms.

8. The robotic cargo apparatus of claim 7, wherein the plurality of sensors comprises one or more of a LIDAR sensor, a GPS sensor, or an IMU sensor, and wherein the high-level control interface uses data from one or more of the LIDAR sensor, the GPS sensor, or the IMU sensor to execute autonomous and assisted driving operations or autonomous ramp ascent and descent algorithms.

9. The robotic cargo apparatus of claim 6, wherein the plurality of sensors comprise two or more of:
   a vehicle height sensor;
   a motor speed sensor;
   a track angle sensor;
   a vehicle orientation sensor;
   a vehicle speed sensor;
   a vehicle location sensor;
   a ramp detection sensor; or
   a collision detection sensor.

10. The robotic cargo apparatus of claim 9, wherein the vehicle height sensor comprises a hydraulic cylinder linear sensor or a downward pointing range finding system.

11. The robotic cargo apparatus of claim 9, wherein the motor speed sensor comprises an encoder coupled with one or more of the each propulsion unit.

12. The robotic cargo apparatus of claim 9, wherein the track angle sensor comprises one or more tilt sensors coupled with each propulsion unit or an encoder coupled with a track bearing of each propulsion unit.

13. The robotic cargo apparatus of claim 9, wherein the vehicle orientation sensor comprises a tilt sensor, a GPS sensor, an IMU, or any combination thereof.

14. The robotic cargo apparatus of claim 9, wherein the vehicle speed sensor comprises a ground speed sensor, an encoder associated with one or more propulsion unit, a GPS sensor, or any combination thereof.

15. The robotic cargo apparatus of claim 9, wherein the vehicle location sensor comprises a GPS sensor.

16. The robotic cargo apparatus of claim 9, wherein the ramp detection sensor comprises a dense 3D sensor unit, an optical imaging component, or any combination thereof.

17. The robotic cargo apparatus of claim 9, wherein the collision detection sensor comprises a dense 3d sensor unit, a sonar, a radar, an optical imaging component, or any combination thereof.

18. The robotic cargo apparatus of claim 1, wherein the robotic cargo apparatus complies with a 463 L cargo handling specification.

19. The robotic cargo apparatus of claim 1, further comprising:
   a hydraulic system to propel, raise, and lower the chassis.

20. The robotic cargo apparatus of claim 19, wherein the hydraulic system is operable to lower the chassis and wherein the robotic cargo apparatus is configured to lockdown on the aircraft as a pallet during flight.

21. The robotic cargo apparatus of claim 1, wherein the plurality of propulsion units comprise tracked or wheel-based propulsion units.

22. A robotic vehicle, comprising:
a vehicle chassis;
one or more propulsion unit coupled with the chassis that is coupled with a power source and a controller to control operation of the propulsion unit;
a plurality of sensors coupled with the chassis and coupled with the controller that provide information to the controller related to a position of the robotic vehicle relative to an aircraft loading ramp;
a controller coupled with the propulsion unit to control the robotic vehicle during drive maneuvering, and that executes autonomous ramp ascent and descent algorithms to move the robotic vehicle onto and off of the aircraft.

23. The robotic vehicle of claim 22, wherein the controller further executes autonomous driving operations to move the robotic vehicle within the aircraft to an identified cargo location within the aircraft.

* * * * *